United States Patent
Van Mil et al.

(10) Patent No.: US 9,775,362 B2
(45) Date of Patent: Oct. 3, 2017

(54) DEVICE AND METHOD FOR CHANGING THE ORIENTATION OF SLAUGHTER PRODUCTS

(71) Applicant: Marel Stork Poultry Processing B.V., AV Boxmeer (NL)

(72) Inventors: Johannes Henricus Maria Van Mil, BK Sint Anthonis (NL); Erik Hendrikus Werner Peters, CX Boxmeer (NL); Tim Sander Rijerse, DR Gemert (NL)

(73) Assignee: Marel Stork Poultry Processing B.V., AV Boxmeer (NL)

( * ) Notice: Subject to any disclaimer, the term of this patent is extended or adjusted under 35 U.S.C. 154(b) by 0 days.

(21) Appl. No.: 15/124,613

(22) PCT Filed: Feb. 25, 2015

(86) PCT No.: PCT/NL2015/050119
§ 371 (c)(1),
(2) Date: Sep. 8, 2016

(87) PCT Pub. No.: WO2015/137799
PCT Pub. Date: Sep. 17, 2015

(65) Prior Publication Data
US 2017/0079291 A1    Mar. 23, 2017

(30) Foreign Application Priority Data
Mar. 10, 2014  (NL) .................................. 2012386

(51) Int. Cl.
*A22C 21/00*     (2006.01)

(52) U.S. Cl.
CPC ...... *A22C 21/0053* (2013.01); *A22C 21/0007* (2013.01)

(58) Field of Classification Search
CPC . A22C 21/00; A22C 21/0007; A22C 21/0046; A22C 21/0053
USPC ................ 452/177, 179, 180, 185, 187–192
See application file for complete search history.

(56) References Cited

U.S. PATENT DOCUMENTS

| | | | | |
|---|---|---|---|---|
| 5,092,815 A | * | 3/1992 | Polkinghorne | .... A22C 21/0053 452/153 |
| 6,478,668 B2 | * | 11/2002 | Visser | ................ A22C 21/0053 452/177 |
| 6,837,782 B2 | * | 1/2005 | Hetterscheid | ...... A22C 21/0053 452/179 |
| 2007/0209406 A1 | | 9/2007 | Criscione et al. | |

FOREIGN PATENT DOCUMENTS

| | | |
|---|---|---|
| EP | 0444782 A1 | 9/1991 |
| EP | 0343700 B1 | 8/1992 |

OTHER PUBLICATIONS

International Search Report, International Patent Application No. PCT/NL2015/050119, dated May 20, 2015, 4 pages.

* cited by examiner

*Primary Examiner* — Richard Price, Jr.
(74) *Attorney, Agent, or Firm* — Casimir Jones, SC

(57) ABSTRACT

The invention provides a device for changing the orientation of slaughter products, comprising an endless guide extending along a conveying path, product carriers which are movable along the guide.

13 Claims, 5 Drawing Sheets

DEVICE AND METHOD FOR CHANGING THE ORIENTATION OF SLAUGHTER PRODUCTS

The present invention relates to a device for changing the orientation of slaughter products such as slaughter birds, comprising an endless guide extending along a conveying path, product carriers which are movable along the guide and which are interconnected at regular intervals by an endless flexible conveying element, which product carriers each comprise a base part and a rotary part connected to the base part, wherein the base part is provided with at least one runner which cooperates with the guide during operation of the device, and wherein the rotary part is provided with an engagement part and with a suspension part connected to the engagement part for suspending a slaughter product from the suspension part, which rotary part is rotatable about an axis of rotation that extends in a vertical plane perpendicular to the conveying path, wherein the device further comprises at least one operating element disposed beside the conveying path, which is configured to cooperate with the engagement part for causing the rotary part to rotate about the axis relative to the base part.

The present invention in particular, but not exclusively, relates to the use thereof in the distribution line of a poultry slaughterhouse. From an evisceration line, in which, inter alia, the intestines are removed from the slaughter birds, the slaughter birds are transferred to a cooling line by means of a transfer device. In the cooling line, the slaughter birds are cooled with air, typically for 0.5-2 hours, to a temperature above the freezing point of typically at most 6° C., so that the slaughter bird will be relatively stiff but not frozen. Then the cooled slaughter birds are transferred to product carriers of a so-called distribution line by means of a transfer device. Alternatively the slaughter birds may be hung on the product carriers of the distribution line by hand, for example from a cooling bath. Partially dependent on the weight of the slaughter birds, further processing of the slaughter birds takes place from the distribution line. It is known to have the weighing of the slaughter birds take place in the transfer device between the cooling line and the distribution line. This adds to the complexity of the transfer device in question. WO 2013/154427 describes an alternative possibility of making use of a weighing device in the conveying device of the distribution line itself. It is important that the slaughter birds, or in general the slaughter products, do not make contact with each other while being weighed, because this will interfere with the weighing process. It is known to convey the slaughter products sideways in the distribution line, as is for example shown in FIG. 1 of WO 2013/154427. The product carriers, and thus the slaughter birds, are typically spaced 6, 8 or 10 inches apart in a distribution line. This involves the risk of adjacent slaughter birds being in contact with each other, in particular at the wings, during the weighing process.

To provide a solution to this problem, European patent EP 343 700 B1 describes a device of the kind described in the introduction. In said device, birds whose breasts are oriented perpendicular to the conveying direction during horizontal transport by means of a suspension conveyor are rotated 45 degrees about a vertical axis of rotation. Said rotation takes place directly before a weighing station so as to prevent adjacent birds, more in particular the wings of adjacent birds, from being into contact with each other. The result (or at least the intended result) of this is that the weighing of a bird at the weighing station cannot be disturbed by contact between adjacent birds. Downstream of the weighing station, the birds are rotated back to their previous orientation. Said rotation of the birds takes place by means of product carriers provided with a strip-shaped connecting part, which is pivotally connected (about a horizontal upper pivot axis) to the base part of the product carrier at an upper end and which is pivotally connected (about a horizontal lower pivot axis) at a lower end to a rotary part of the product carrier from which the bird is suspended. At the lower end, the connecting part is furthermore provided with two supporting rollers, which are rotatable about an axis of rotation that coincides with the lower pivot axis. The aforesaid rotation is effected in that a guide is provided in the path of the connecting part, more specifically of the supporting rollers thereof. The initial vertical orientation of the connecting part is changed into a horizontal orientation in a rising part of the guide, with the rotary part of the product carrier, including the bird suspended therefrom, being lifted and the connecting part pivoting about the lower pivot axis and about the upper pivot axis with respect to the rotary part and the engagement part, respectively. The pivoted connection between the connecting part and the rotary part is configured so that pivoting of the connecting part and the rotary part relative to each other about the lower pivot axis is accompanied by rotation of the rotary part about a vertical axis of rotation relative to the connecting part. Weighing by the weighing station substantially takes place in the horizontal part of the guide that connects to the rising part.

The device according to EP 343 700 B1 has the drawback that there is a risk of the birds being damaged as a result of being rotated, because parts of the birds, such as typically the wings, hook behind each other. More specifically, the wings can be damaged as a result of this. Another risk is that birds are partially pulled out of the product carrier as a result of being in contact with each other, with the birds remaining suspended from the product carrier with only one leg or even being pulled completely out of the product carrier upon being rotated, or that birds do not properly rotate but rather twist. The more the birds behave like relatively stiff members, the greater this risk will be. It may happen in practice that the birds remain longer in a cooling line than intended, for example if there has been a malfunction, as a result of which the temperature will fall below the freezing point and the birds showing signs of freezing. Mutual entanglement of birds may also lead to damage to the product carriers. The object of the present invention is to reduce the above risks. In order to achieve that object, the device according to the invention is characterised in that the conveying path comprises an arcuate section extending in a vertical plane, wherein the product carriers are present on the outer side of the arc, and that the operating element is disposed beside the arcuate section for causing the rotary parts of the product carriers to rotate at least in part about the associated axes of rotation during passage of the product carrier through the arcuate section, wherein the rotary part cannot pivot about a horizontal pivot axis that extends perpendicular to a vertical plane parallel to the arcuate section during passage of the associated product carrier through the arcuate section. As a result of the above aspects, the distance apart between the birds, which are present on the outer side of the arcuate section, is increased during their passage through the arcuate section. The invention makes use of this aspect by having the rotation of the birds take place exactly during their passage through the arcuate section. The risk of contact between adjacent birds can thus be significantly reduced.

According to one embodiment, which is advantageous in part because of its simplicity, the engagement part comprises a contact body which is in contact with the operating part via a contact surface during cooperating contact between the engagement part and the operating element, wherein the contact surface is at least in part two-dimensionally arcuate in shape, defining an arc which is oriented perpendicular to the axis of rotation, and wherein the axis of rotation is located on the inner side of the arcuate shape, wherein the axis of rotation intersects the arc at the location of a point of intersection, wherein the distance between a point on the arc and the point of intersection is different for different points along the arc. Said different distances provide a great deal of freedom to have the rotation of the rotary part relative to the base part take place along a desired length of the conveying path and with a desired angular velocity without the operating element needing to be configured in a special way for this purpose. Jerky rotation of the rotary part can thus be prevented. Jerky rotation will sooner lead to the slaughter products being damaged and/or starting to sway. Said swaying may interfere with possible subsequent weighing at a weighing station, making it necessary to increase the length of the section between the position where the slaughter products are rotated and the weighing station to allow said swaying to stop.

The above advantages can also be obtained with a device according to the prior art. Accordingly, the present invention also relates to a device for changing the orientation of slaughter products such as slaughter birds, comprising an endless guide extending along a conveying path, product carriers which are movable along the guide and which are interconnected at regular intervals by means of an endless flexible conveying element, which product carriers each comprise a base part and a rotary part connected to the base part, wherein the base part is provided with at least one runner which cooperates with the guide during operation of the device, and wherein the rotary part is provided with an engagement part and with a suspension part connected to the engagement part for suspending a slaughter product from the suspension part, which rotary part is rotatable about an axis of rotation that extends in a vertical plane perpendicular to the conveying path, wherein the device further comprises at least one operating element disposed beside the conveying path, which is configured to cooperate with the engagement part for causing the rotary part to rotate about the axis relative to the base part, wherein the engagement part comprises a contact body which is in contact with the operating part via a contact surface during cooperating contact between the engagement part and the operating element, wherein the contact surface is at least in part arcuate in shape, defining an arc which is oriented perpendicular to the axis of rotation, and wherein the axis of rotation is located on the inner side of the arcuate shape, wherein the axis of rotation intersects the arc at the location of a point of intersection, wherein the distance between a point on the arc and the point of intersection is different for different points along the arc.

The shape of the contact body preferably conforms at least in part to the shape of an oval. Such a configuration makes it possible to realise a relatively smooth rotation.

In general it is preferable if the operating element and the respective engagement parts are configured to cooperate such that the rotation of the rotary part about the axis of rotation relative to the base part takes place during movement of the product carriers over a distance greater than the distance apart between the product carriers. The slaughter products can thus be rotated relatively smoothly so as to prevent or at least limit the extent of swaying of the slaughter products.

To prevent undesirable rotation of the rotary part, the product carriers each comprise operable locking means for locking the rotary part against rotation about the axis of rotation in a first operating position of the locking means and for enabling the rotary part to rotate about the axis of rotation in a second operating position of the locking means.

To prevent or at least limit the extent of swaying of the product carrier, and thus of the slaughter products, in a direction parallel to the conveying direction, the base part preferably comprises two pairs of runners arranged one behind the other.

The invention provides advantages inter alia in connection with the in-line weighing of slaughter products. Accordingly, a possible embodiment of the device according to the invention comprises a weighing station downstream of the arcuate section for weighing poultry that has been moved through the arcuate section.

Furthermore preferably, the weighing station comprises a weighbridge that forms part of the guide.

The risk of contact between adjacent slaughter products is reduced in particular if the operating element and the respective engagement parts are configured for rotating the rotary part through at least 30 degrees, furthermore preferably through at least 60 degrees, relative to the base part.

The risk of undesirable swaying of the slaughter products can be limited if the base part and the rotary part are rigidly interconnected except for the fact that the rotary part can rotate about an axis of rotation relative to the base part.

The invention further provides a method for using a device according to the invention. In this method, the rotary parts of the product carrier rotate at least in part about the associated axes of rotation while the product carrier passes through the arcuate section.

The invention will be explained in more detail below by a description of a possible, non-limitative embodiment of a device according to the invention with reference to the following figures.

Figure 1:
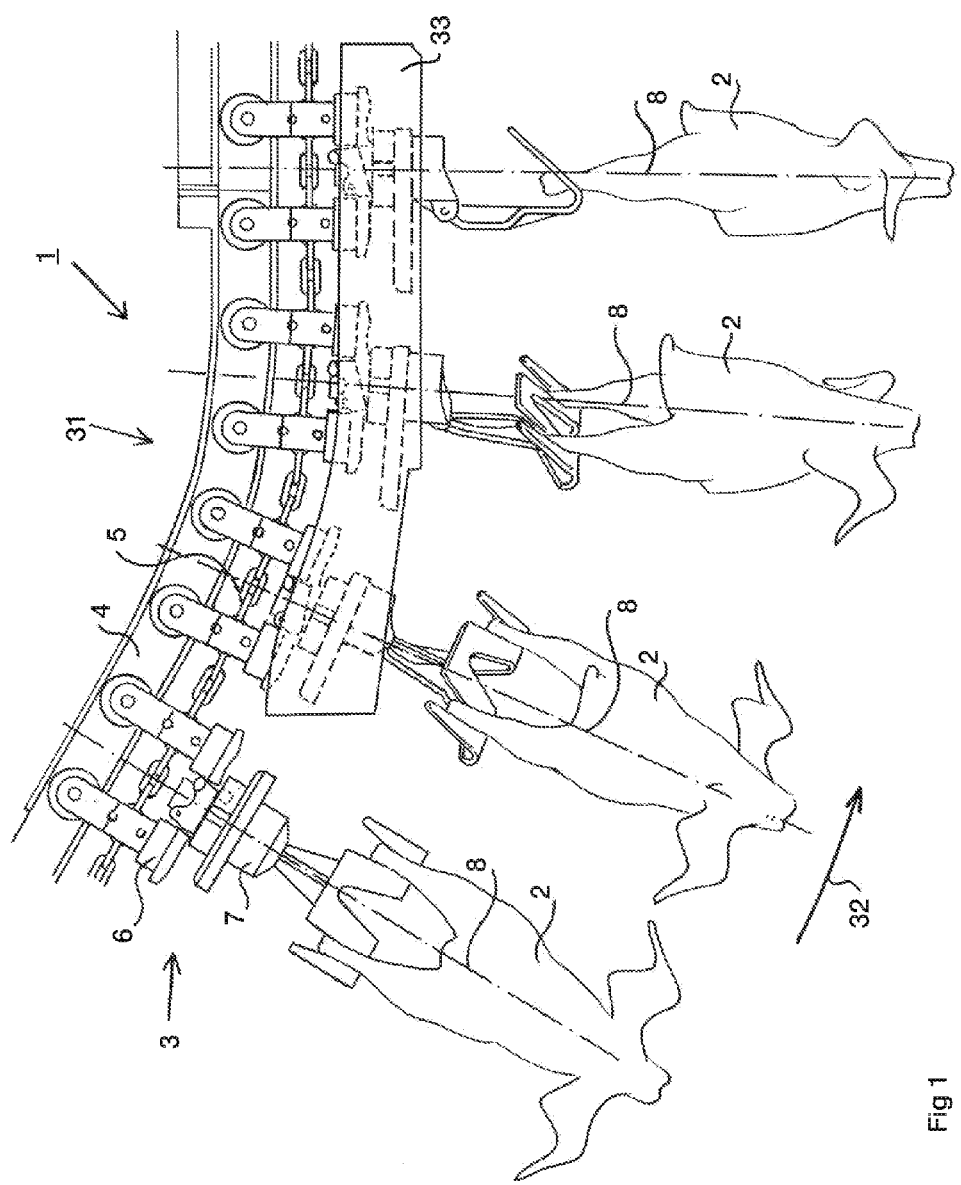
FIG. 1 is a side view of a device according to the invention which forms part of a distribution line.

FIG. 1 shows a part of the distribution line 1 for distributing slaughter birds 2. Disposed upstream of the distribution line 1 is a cooling line. In this cooling line the temperature of the slaughter birds 2 has been reduced to, for example, 3° C. Because of this, the slaughter birds 2 are stiffer in comparison with the situation shortly after they were slaughtered, when the slaughter birds still had a higher body temperature. The slaughter birds 2 have been transferred to product carriers 3 of the distribution line 1 from hooks from which the slaughter birds 2 are suspended in the cooling line. The distribution line 1 comprises an endless guide 4, along which the product carriers 3 move. The product carriers 3 are interconnected via a link chain 5, which is engaged by at least one driven sprocket (not shown) for moving the chain-link 5, and thus the product carriers 3, along the path of the endless guide 4. FIG. 1 shows an arcuate section 31 which is defined by the arcuate shape of the guide 4. The product carriers 3 are located on the outer side of the arc of the section 31.

The product carriers 3 are built up of a base part 6 on the upper side of the product carrier 3 and a rotary part 7 on the bottom side of the product carrier 3. The rotary part is connected to the base part 6 in such a manner as to be rotatable about an axis of rotation 8 that extends in a vertical plane perpendicular to the conveying path defined by the path of the guide 4.

The base part 6 comprises two fork members 9. The two legs of each of the fork members 9 extend upward. The base part 6 further comprises two runners 10 for each fork body 9, which runners are connected to the upper end of the upwardly extending legs of the fork members 9 in such a manner as to be rotatable about their respective axes. Each base part 6 thus comprises two pairs of runners 10, which are spaced 4 inches apart. In use, the runners run over running surfaces of the guide 4. The two fork members 9 of each base part 6 are interconnected at their bottom ends via a bridge member 11 of the base part 6.

The rotary part 7 may be considered to be built up of an engagement part 25 on the upper side of the rotary part 7 and a hook part 12 on the bottom side of the rotary part 7. The engagement part 25 and the hook part 12 are rigidly interconnected. The hook part 12 comprises two inclined grooves 13, which each have an open upper end. The width of the grooves 13 decreases in the direction of the lower, closed end thereof. In use, the slaughter birds 2 are suspended from the grooves 13 by their ankle joints.

The engagement part 25 has a contact body 14 which has an arcuate, more specifically oval circumference. The oval shape defines a virtual arc face that extends parallel to the oval shape within the thickness of the contact body 14. The axis of rotation 8 is oriented perpendicular to the arc face. The axis of rotation 8 intersects the arc at a point of intersection 15. The oval shape of the contact body 14 and the location of the point of intersection 15 relative to the contact body 14 are such that the distance between a point on the circumference of the contact body 14 and the point of intersection 15 is different for different points on the circumference of the contact body 14. For the left-hand carrier 3 in FIG. 3 this is indicated as dimensions d1 and d2 for two arc points 14-1 and 14-2, respectively. Dimension d is smallest at arc point 14-0, which faces in the same direction as the open ends of the grooves 13, seen in top plan view, whilst dimension d is greatest at arc point 14-3. The arc points 14-0 and 14-3 are located opposite each other relative to point of intersection 15, or in other words, relative to the axis of rotation 8, which extends perpendicular to the plane of the drawing in FIG. 3. The greater the angle α between the lines d0 and dn for the various arc points 14*n*, the greater the distance dn between the arc points 14-0 and 14-3.

Above the oval-shaped contact body 14, the engagement part 25 is further provided with a square contact body 16. The contact body 16 consists of four merlon-like contact body parts 17, which are each provided at a corner of the square shape of the contact body 16, defining said square shape. Recesses 18 are provided between the contact body parts 17. Each contact body part 17 has two right-angled guide surfaces 19*a*, 19*b*, each of which guide surfaces 19*a*, 19*b* is aligned with a guide surface 19*a*, 19*b* of an adjacent contact body part 17.

Figure 2:
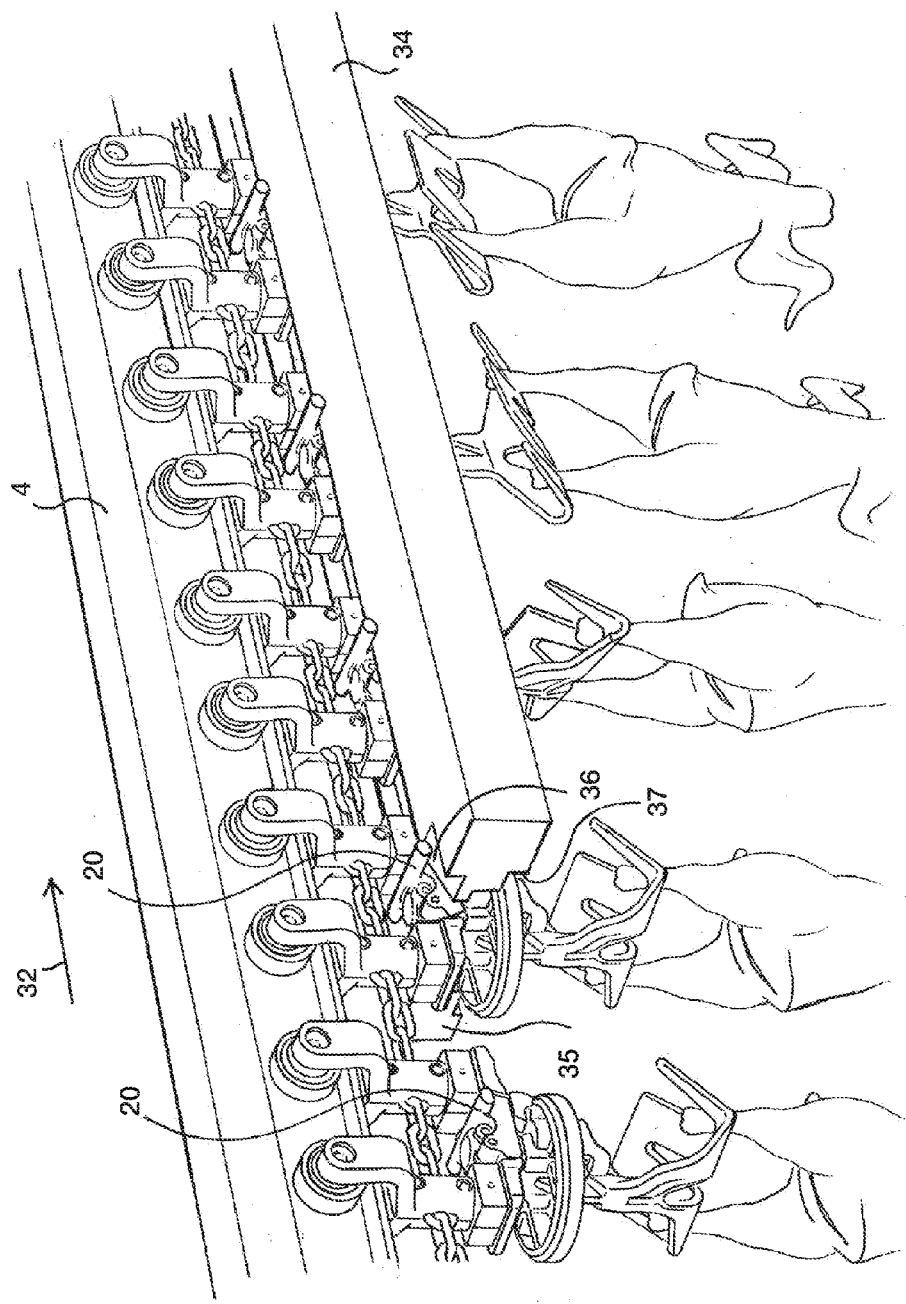
FIG. 2 is a perspective view of another part of the distribution line of FIG. 1, which other part forms a device according to another aspect of the invention.
Figure 4B:
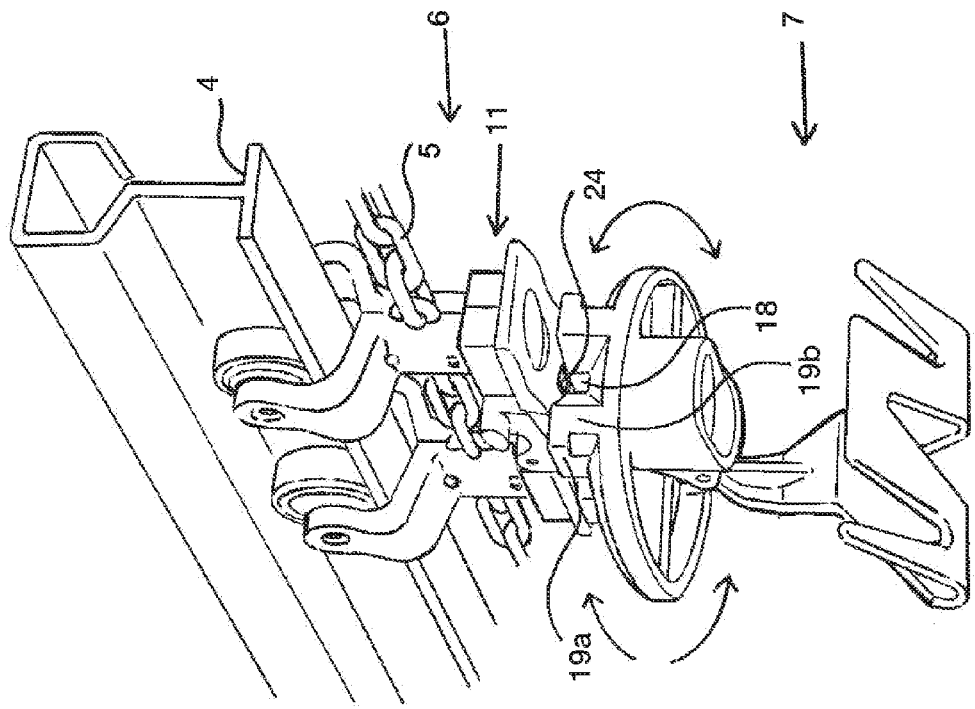
FIGS. 4a and 4b are perspective views of a product carrier in a locked position and a non-locked position, respectively.
Figure 4A:
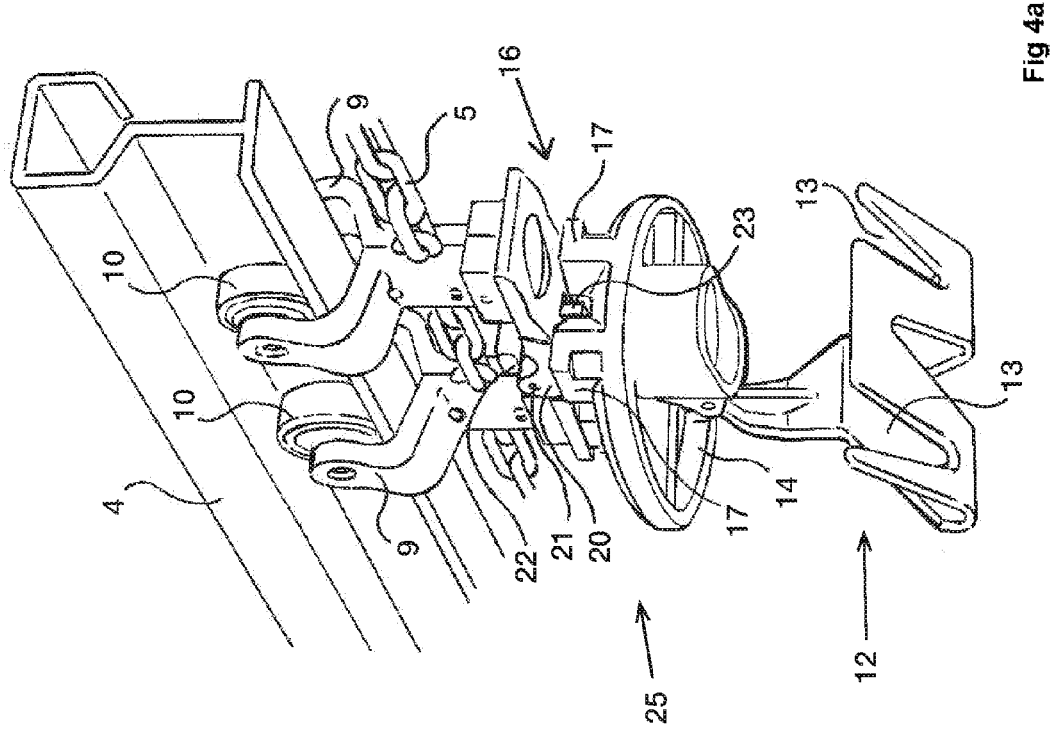

The bridge member 11 of the base part 6 comprises an operating arm 20 between the fork members 9, which operating arm can pivot forward and backward about a horizontal pivot axis 21, between a lower pivoted position and an upper pivoted position, relative to (the other part of) the bridge member 11. The pivot axis 21 extends perpendicular to the conveying path. The operating arm 20 has a laterally oriented engagement arm 22 and a downwardly oriented pin 23. In a so-called locking position, the operating arm 20 is in the lower pivoted position and the pin 23 extends into a recess 18 between two adjacent contact body parts 17 via a vertical through hole 24 in the bridge member 11. In this position, the end of the pin 23 locks the rotary part 7 against rotation about the axis of rotation 8 relative to the base part 6. By pivoting the operating arm 20 to the upper pivoted position, as shown in FIG. 4*b* and for all the product carriers in FIGS. 1 and 2, except for the respective left-hand product carrier 3 shown in said figures, the locking engagement in question is released in that the pin 23 no longer extends into the recess 18.

The rotary part 7 is connected to the base part 6 in such a manner that the only movement that the rotary body 7 can make with respect to the base part 6 is the rotation about the axis of rotation 8. As already indicated, this movement is only possible if the operating 20 is in the upper, non-locking position. More specifically, the rotary part 7 is connected to the base part 6 in such a manner that pivoting of the rotary part 7 relative to the base part 6 about a horizontal pivot axis that extends perpendicular to the conveying path or about an axis of rotation that extends parallel to the conveying path is not possible.

Upon passing through the arcuate section 31, the rotary part 7 rotates 90 degrees about the associated axis of rotation 8 relative to the associated base part 6. Prior to said rotation during the movement ahead of the slaughter birds 2 in the conveying direction 32, the breast and the back are oriented sideways, that is, in horizontal direction perpendicular to the conveying direction 32. After rotation of the slaughter birds 2 downstream of the arcuate section 31, the slaughter bird's breast is oriented rearward, seen in the conveying direction, and the back of the slaughter bird 2 is oriented forward. As a result of said rotation, the distance apart between successive slaughter birds 2 has increased, so that the risk of contact will be smaller. Such contact might interfere with a weighing operation on the downstream side of the arcuate section 31.

To make rotation of the rotary part 7 with the slaughter birds 2 suspended therefrom possible, the distribution line 1 is provided with two stationary guide members 33 on either side of the path that the engagement part 25 of the rotary part 7 follows upon passing through the arcuate section 31. Only one of the two guide members 33 is shown in FIG. 1.

Provided downstream of the arcuate section 31, in a rectilinear, horizontally extending straight part of the guide 4, is a weighing station (not shown) where slaughter birds 2 can be weighed. Such weighing can for example take place by a weighing station comparable to the weighing station described in WO 2013/154427, which weighing station is provided with a weighbridge that forms part of a guide such as the guide 4. Downstream of said weighing station, the rotary parts 7 are rotated back in a straight part of the guide 4 by guide members 34, 35, which, just like the guide members 33, are provided as stationary elements on either side of the path of the engagement part 25 of the successive product carriers 3. The operation of the guide members 33 is comparable to that of the guide members 34, 35, with this difference that the guide members 33 are provided at the location of the arcuate section 33, whilst the guide members 34, 35, on the other hand, are provided at the location of a straight section. Because of the arcuate configuration of the section 31 and the fact that the product carriers 3, and thus the slaughter birds 2, are present on the outer side of the arcuate section 31, the distance apart between the successive slaughter birds 2, whose backs and chests are oriented sideways, is greater than the distance apart between successive slaughter birds 2 in a rectilinear section. This reduces the risk of in particular the wings of adjacent slaughter birds 2 becoming entangled during the rotation shown in FIG. 1, which might for example lead to damage to the slaughter birds or to the product carriers 3. The greater the dimension of the slaughter birds and the further the wings extend sideways, the greater the above risk will be. The skilled person will appreciate that the ends of the wings of the two slaughter birds 2 on the left-hand side of FIG. 1 could touch and overlap each other upon passing through an upstream rectilinear part of the conveying path.

Figure 3:
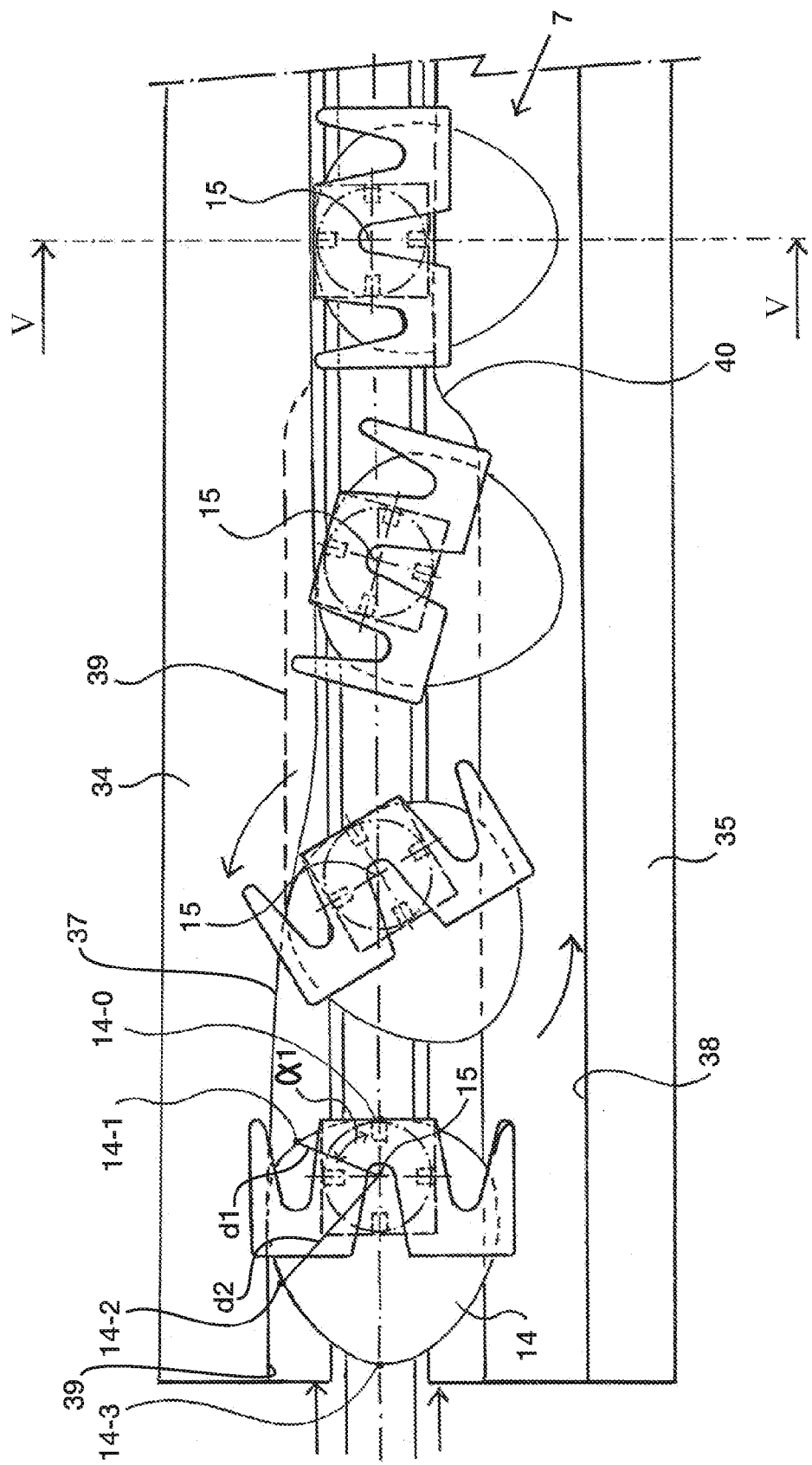
FIG. 3 is a schematic bottom view of a part of FIG. 2.

On its upstream side, the guide member 34 is provided with a run-on surface 36 which is positioned and configured so that the engagement arms 22 slide over the surface and are moved upward, so that the operating arm 20 is moved from the locking position to the non-locking position and rotation of the rotary part 7 is made possible. Said rotation is subsequently effected in that the contact body 14 makes contact with a curved edge 37 of guide member 34, which, as shown in FIG. 3, extends in such a way that the distance between the curved edge 37 and the axes of rotation 8 of the passing product carriers 3 decreases. Because of the contact between the curved edge 37 and the contact body 14, which contact takes place on the upstream side of the axis of rotation 8 and the point of intersection 15, the rotary part 7 rotates through an angle of 90 degrees about the axis of rotation 8. The aforesaid contact is both a rolling contact and a dragging contact. The rotation takes place over a distance which is greater than the 8 inch pitch between two adjacent carriers 3. The guide member 35 comprises a retaining edge 38 at the same vertical level as the curved edge 37 opposite thereof. During normal operation no interaction takes place between the retaining edge 38 and the contact body 14.

Figure 5:
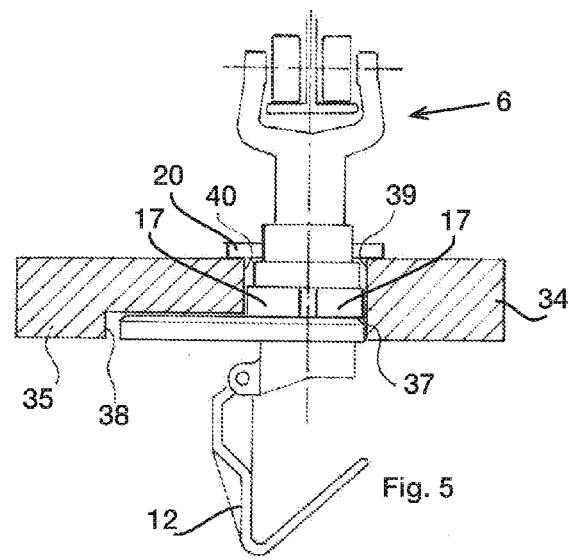
FIG. 5 is a schematic sectional view along the line V-V in FIG. 3.
Figure 6:
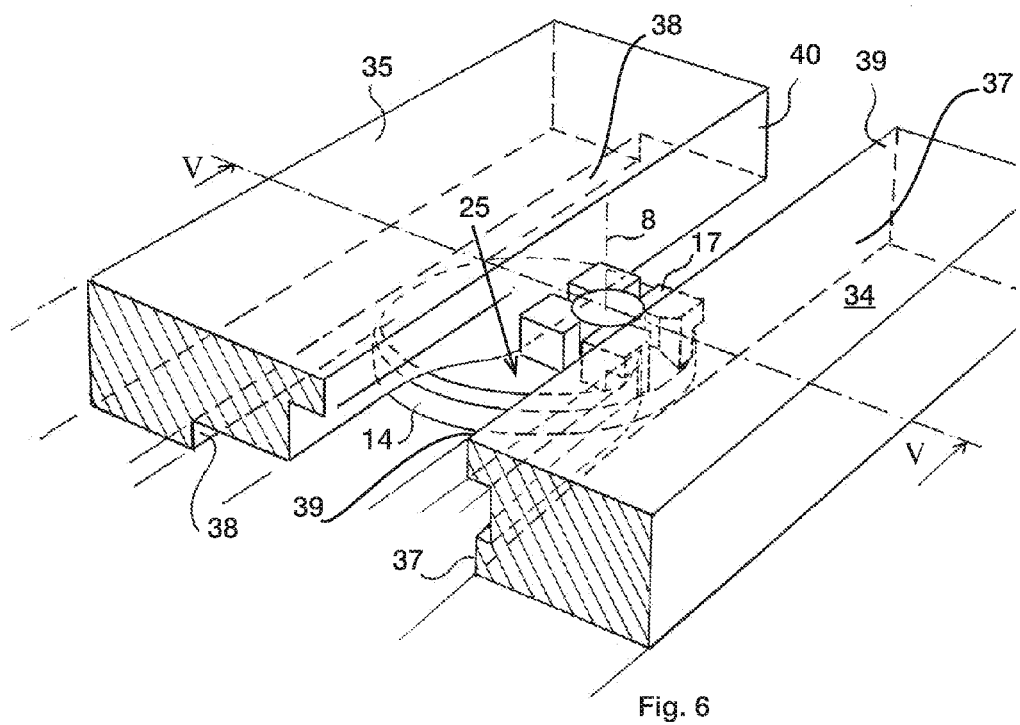
FIG. 6 is a perspective view of a part of FIG. 5.

Above the level of the curved edge 37 and the retaining edge 38, the guide members 34, 35 are provided with further curved edges 39, 40 (see also FIGS. 5 and 6. The further curved edges 39, 40 are designed to mate with the square contact body 16. On the downstream side of the guide members 34, 35, the further curved edges 39, 40 exhibit curvatures similar in shape which follow each other closely, seen in the conveying direction, so that the guide edges 39, 40 on the upstream side of the guide members 34, 35 are spaced more closely together, viz. by a distance that is slightly greater than the length of a side of the square contact body 16. The square contact body 16 is thus retained between further guide edges 39, 40, as a result of which the rotary part 7 is forced to assume an exactly perpendicular orientation. Downstream of the guide members 34, 35, the operating arm 20 pivots back to the locking position again under the influence of the force of gravity, possibly aided by a downwardly inclined guide surface, in which position the end of the pin 23 falls into the recess 18 located thereunder between two adjacent contact body parts 17. The parts of the respective guide members 34, 35 which are directly adjacent to the curved edges 39, 40 and are thus provided just above the level of the contact body 14, extend in part directly above the path of the passing contact bodies 14 within the length of the guide members 34, 35. Pivoting of the contact bodies 14, and thus of the product carriers 3 as a whole, in lateral direction is prevented in this way.

As indicated, the guide members 33 function in a manner absolutely comparable to the guide members 34, 35, and consequently a more detailed explanation and description of the guide members 33 is not necessary here.

The advantages of the invention also apply to other processes than the weighing of slaughter birds, for example to the stretching of wings or the making of (stationary or moving) video images from a desired direction, or to other types of slaughter products.

The invention claimed is:

1. A device for changing the orientation of slaughter products such as slaughter birds, comprising an endless guide extending along a conveying path, product carriers which are movable along the guide and which are interconnected at regular intervals by an endless flexible conveying element, which product carriers each comprise a base part and a rotary part connected to the base part, wherein the base part is provided with at least one runner which cooperates with the guide during operation of the device, and wherein the rotary part is provided with an engagement part and with a suspension part connected to the engagement part for suspending a slaughter product from the suspension part, which rotary part is rotatable about an axis of rotation that extends in a vertical plane perpendicular to the conveying path, wherein the device further comprises at least one operating element disposed beside the conveying path, which is configured to cooperate with the engagement part for causing the rotary part to rotate about the axis relative to the base part, wherein the conveying path comprises an arcuate section extending in a vertical plane, wherein the product carriers are present on the outer side of the arc, and that the operating element is disposed beside the arcuate section for causing the rotary parts of the product carriers to rotate at least in part about the associated axes of rotation during passage of the product carrier through the arcuate section, wherein the rotary part cannot pivot about a horizontal pivot axis that extends perpendicular to a vertical plane parallel to the arcuate section during passage of the associated product carrier through the arcuate section.

2. A device according to claim 1, wherein the engagement part comprises a contact body which is in contact with the operating part via a contact surface during cooperating contact between the engagement part and the operating element, wherein the contact surface is at least in part arcuate in shape, defining an arc which is oriented perpendicular to the axis of rotation and wherein the axis of rotation is located on the inner side of the arcuate shape, wherein the axis of rotation intersects the arc at the location of a point of intersection, wherein the distance between a point on the arc and the point of intersection is different for different points along the arc.

3. A device according to claim 2, wherein the shape of the contact body conforms at least in part to the shape of an oval.

4. A device according to claim 1, wherein the operating element and the respective engagement parts are configured to cooperate such that the rotation of the rotary part about the axis of rotation relative to the base part takes place during movement of the product carriers over a distance greater than the distance apart between the product carriers.

5. A device according to claim 1, wherein the product carriers each comprise operable locking means for locking the rotary part against rotation about the axis of rotation in a first operating position of the locking means and for enabling the rotary part to rotate about the axis of rotation in a second operating position of the locking means.

6. A device according to claim 1, wherein the base part comprises two pairs of runners arranged one behind the other.

7. A device according to claim 1, wherein the device comprises a weighing station downstream of the arcuate section for weighing poultry that has been moved through the arcuate section.

8. A device according to claim 7, wherein the weighing station comprises a weighbridge that forms part of the guide.

9. A device according to claim 1, wherein the operating element and the respective engagement parts are configured for rotating the rotary part through at least 30 degrees relative to the base part.

10. A device according to claim 9, wherein the operating element and the respective engagement parts are configured for rotating the rotary part through at least 60 degrees relative to the base part.

11. A device according to claim 1, wherein the base part and the rotary part are rigidly interconnected except for the fact that the rotary part can rotate about an axis of rotation relative to the base part.

12. A method for using a device according to claim 1, wherein the rotary parts of the product carrier rotate at least in part about the associated axes of rotation during passage of the product carrier through the arcuate section.

13. A device for changing the orientation of slaughter products such as slaughter birds, comprising an endless guide extending along a conveying path, product carriers which are movable along the guide and which are interconnected at regular intervals by an endless flexible conveying element, which product carriers each comprise a base part and a rotary part connected to the base part, wherein the base part is provided with at least one runner which cooperates with the guide during operation of the device, and wherein the rotary part is provided with an engagement part and with a suspension part connected to the engagement part for suspending a slaughter product from the suspension part, which rotary part is rotatable about an axis of rotation that extends in a vertical plane perpendicular to the conveying path, wherein the device further comprises at least one operating element disposed beside the conveying path, which is configured to cooperate with the engagement part for causing the rotary parts to rotate about the axis relative to the base part, wherein the engagement part comprises a contact body which is in contact with the operating part via a contact surface during cooperating contact between the engagement part and the operating element, wherein the contact surface is at least in part arcuate in shape, defining an arc which is oriented perpendicular to the axis of rotation, and wherein the axis of rotation is located on the inner side of the arcuate shape, wherein the axis of rotation intersects the arc at the location of a point of intersection, wherein the distance between a point on the arc and the point of intersection is different for different points along the arc.

* * * * *